H. B. GILLETTE.
PNEUMATIC TIRE.
APPLICATION FILED OCT. 8, 1912.
1,104,186.
Patented July 21, 1914.
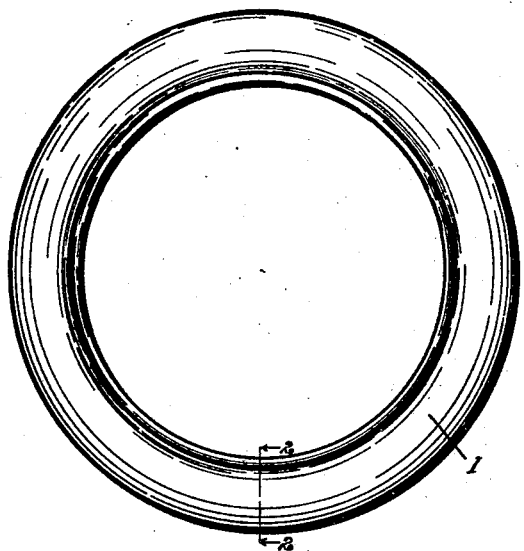
Fig. I.
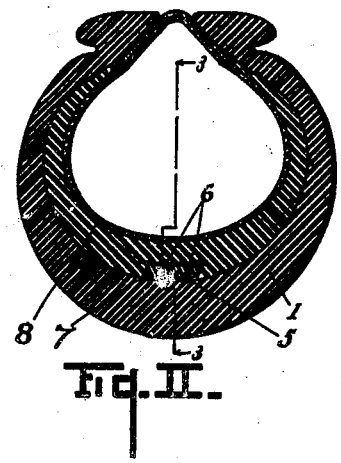
Fig. II.
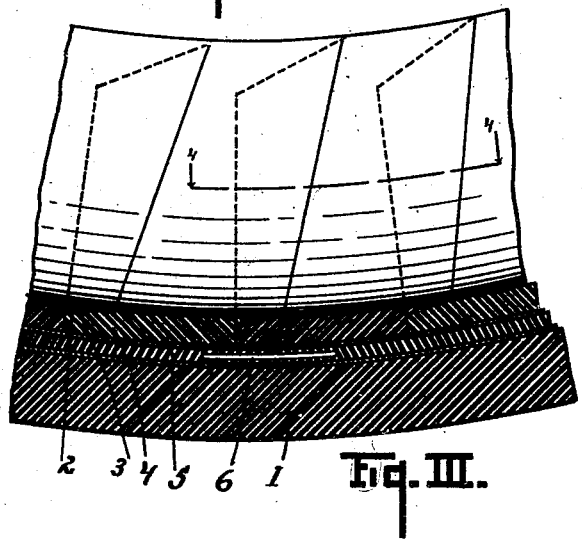
Fig. III.
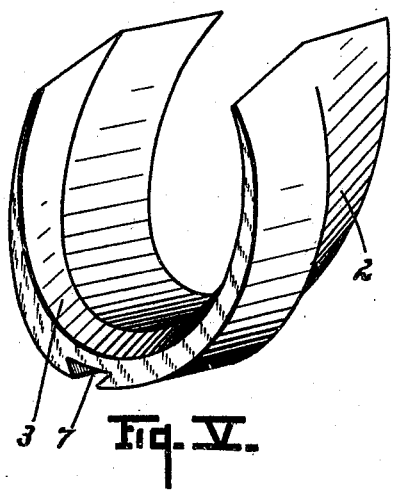
Fig. V.
Fig. IV.
Witnesses
M. P. Woodruff
M. L. Glasgow
Inventor
Herbert B. Gillette
By Chappell & Earl
Attorney

UNITED STATES PATENT OFFICE.

HERBERT B. GILLETTE, OF GRAND RAPIDS, MICHIGAN.

PNEUMATIC TIRE.

1,104,186.  Specification of Letters Patent.  Patented July 21, 1914.

Application filed October 8, 1912. Serial No. 724,499.

*To all whom it may concern:*

Be it known that I, HERBERT B. GILLETTE, a citizen of the United States, residing at Grand Rapids, county of Kent, State of Michigan, have invented certain new and useful Improvements in Pneumatic Tires, of which the following is a specification.

This invention relates to improvements in pneumatic tires.

The main objects of this invention are, first, to provide an improved pneumatic tire which is durable in use and not likely to be injured by punctures or blowouts; second, to provide an improved tire element adapted as a protector of pneumatic tires which does not materially affect the resiliency or elasticity of the tire and which at the same time protects the inner tube; third, to provide an improved tire element having these advantages, which may be readily applied to either new or used pneumatic tire casings and one which permits the use of lighter casings than are now commonly required.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side elevation of a tire embodying the features of my invention. Fig. II is an enlarged cross section taken on a line corresponding to line 2—2 of Fig. I. Fig. III is an enlarged detail longitudinal section taken on a line corresponding to the broken line 3—3 of Fig. II, the inner or pneumatic tube being omitted. Fig. IV is a detail section on a line corresponding to line 4—4 of Fig. III. Fig. V is a perspective view of one of the members 2.

In the drawing similar reference characters refer to similar parts throughout the several views, and the sectional views are taken looking in the direction of the little arrows at the ends of the section lines.

Referring to the drawing, the outer casing 1 is shown in conventional form for convenience and is indicated as being formed of rubber. It is my intention to use any suitable outer casing.

My improved protector element comprises a plurality of crescent shaped or segmental members 2 which are formed of rubber or other suitable resilient material, preferably comparatively soft rubber. These members 2 are in practice, about two inches long but the length may be varied considerably, and when arranged within the casing, their arms extend substantially to the top thereof as shown in Fig. III. The members 2 are interiorly beveled as at 3 at one end and provided with joint tongues or laps 4 at the other end. The joint tongues or laps 4 are wedge-shaped and adapted to fit into the bevels of the adjacent members 2.

The bevels and joint tongues are wider or expanded toward the tops of the members 2 as shown by dotted lines in Fig. III, the object being to permit the spreading of the tops of the members 2 when the tire passes over an obstruction without opening the joints between them. The members 2 are arranged with their ends abutting on the ring 5 which is preferably secured within the tread of the outer casing 1, it being in effect when so secured an annular rib therein. This ring 5 is flat and dove-tailed in cross section and is formed of resilient material preferably rubber with an outer canvas covering as shown in the drawing.

The ring is in practice, cemented to the outer casing, the ends of the ring being brought together and joined by the dowels 6. The members 2 are provided with dove-tailed notches 7 at their bases adapted to receive the ring 5. The members 2 are thus secured within the casing so that they cannot shift about therein and form a continuous protector for the inner tube 8. The members 2 are placed within the casing under compression so that their ends are held in contact by their own resiliency. They may be placed upon the supporting or articulating ring 5 either before or after placing within the casing.

While I prefer to secure the rib or articulating ring by cementing it to the casing as the structure is more satisfactory in operation, the protector element is of advantage for use when the ring is unsecured to the casing.

When the inner tube is expanded, the protector members are forced into contact with the outer casing and form a continuous support for the inner tube.

In the event of the outer casing being punctured by a nail or the like, the point of the nail engaging one of the members 2, the member will ordinarily yield before being punctured. This ordinarily deflects the nail between the member and the casing, or the member yields sufficiently before being punctured to prevent the nail reaching the inner tube. In the event of the nail puncturing the outer casing and engaging between a pair of the members, the nail is ordinarily deflected by the yielding of the members and the joint lap or tongue before it reaches the inner tube and is embedded in one or the other of the members.

In the event of cuts or the like or openings in the outer casing, the members 2 effectively bridge the opening and prevent the inner tube blowing out therethrough. The outer casing is also protected by the members 2 as it is known that in the event of punctures of the outer casing, the break formed by the puncture on the inner side of the casing is the starting point for wear between the inner tube and the casing and the casing is frequently weakened by this wear so that blowouts occur.

The protector element effectively relieves the strain on the outer casing so that if desired, thinner outer casings may be used which is of very great advantage as the cost of an outer casing depends quite largely on the number of plies therein. A further advantage of my structure is that it supports the outer casing to a considerable degree so that it is not so likely to be injured when deflated.

I have not attempted to illustrate or describe various modifications which I contemplate as such modifications will be understood by those skilled in the art to which this invention relates from the disclosure made.

In a companion application, filed June 7, 1912, Ser. No. 702,147, I show another embodiment of my invention.

Having thus described my invention, what I claim as new and desire to secure by Letters Patent is:

1. In a tire, the combination with an outer casing and a pneumatic tube, of a protector element interposed between the casing and tube comprising a ring secured within the tread portion of said casing, said ring being flat and dove-tailed in cross section, and crescent shaped members of resilient material having dove-tailed notches in their bases engaging said ring, said members being arranged on said ring with their ends abutting and being interiorly beveled at one end and provided with corresponding wedge-shaped joint tongues at the other end fitting the bevels of adjacent members, the said bevels and joint tongues being expanded upwardly from the bases of said members.

2. In a tire, the combination with an outer casing and a pneumatic tube, of a protector element interposed between the casing and tube comprising a ring secured within the tread portion of said casing, said ring being flat and dove-tailed in cross section, and crescent shaped members of resilient material having dove-tailed notches in their bases engaging said ring.

3. A tire comprising an outer casing provided with an internal annular dove-tailed rib; crescent shaped members of resilient material having dove-tailed notches in their bases engaging said rib said members being arranged with their ends abutting and being interiorly beveled at one end and provided with corresponding joint tongues at the other end, fitting the bevels of adjacent members, the said bevels and joint tongues being expanded upwardly from the bases of said members, and a pneumatic tube arranged within said members.

4. A tire comprising an outer casing provided with an internal annular dove-tailed rib; crescent shaped members of resilient material having dove-tailed notches in their bases engaging said rib, and a pneumatic tube arranged within said members.

5. An element for pneumatic tires comprising a ring, and crescent shaped members of rubber having notches in their bases engaging said ring, said members being arranged on said ring with their ends abutting and being interiorly beveled at one end and having corresponding joint tongues at the other fitting the bevels of the adjacent members, said bevels and joint members being expanded upwardly from the bases of said members.

6. An element for pneumatic tires comprising a ring and crescent shaped members of flexible soft rubber having notches in their bases engaging said ring whereby they are independently supported thereon, said members being provided with joint laps to permit movement of the members relative to each other.

In witness whereof, I have hereunto set my hand and seal in the presence of two witnesses.

HERBERT B. GILLETTE. [L. S.]

Witnesses:
 FRANCIS A. STACE,
 GRACE L. SENNA.

Copies of this patent may be obtained for five cents each, by addressing the "Commissioner of Patents, Washington, D. C."